United States Patent [19]

Thompson et al.

[11] 4,077,447
[45] Mar. 7, 1978

[54] TREE SHEAR ACTUATOR RESTRAINT SYSTEM

[75] Inventors: Warren Lynn Thompson, Galena, Ill.; Lynn Edward Kurt, Dubuque, Iowa

[73] Assignee: Deere & Company, Moline, Ill.

[21] Appl. No.: 774,871

[22] Filed: Mar. 7, 1977

[51] Int. Cl.² .............................................. A01G 23/08
[52] U.S. Cl. .................................... 144/34 E; 83/600; 92/161; 144/3 D
[58] Field of Search ................. 144/3 D, 34 R, 34 E, 144/309 AC; 83/600; 92/161, 146

[56] References Cited

U.S. PATENT DOCUMENTS

| 2,641,942 | 6/1953 | Mueller | 83/600 X |
| 3,808,909 | 5/1974 | Johnson | 144/34 E X |
| 3,826,295 | 7/1974 | Johnson et al. | 144/34 E |

Primary Examiner—Donald R. Schran
Assistant Examiner—W. D. Bray

[57] ABSTRACT

A tree shear head includes a frame which supports a pair of parallel crank shafts which are respectively linked to a pair of shear blades for moving the latter together into the trunk of a tree to be sheared upon rotation of the crank shafts. The crank shafts are rotated by means of an actuator including a cylinder in which a pair of piston and rod units are mounted with the rods projecting oppositely and being respectively connected to the pair of crankshafts. To prevent the cylinder of the actuator from shifting axially relative to the rods and from rotating on the rods, cables are connected between the cylinder and the frame.

5 Claims, 2 Drawing Figures

TREE SHEAR ACTUATOR RESTRAINT SYSTEM

BACKGROUND OF THE INVENTION

The present invention relates to a restraint system for preventing a cylinder of a hydraulic actuator from shifting endwise on or rotating about piston and rod units in the cylinder while permitting the actuator to undergo certain movement as a unit.

U.S. Pat. No. 3,826,295 granted to Johnson et al. on July 30, 1974 discloses a shear head including a main frame supporting a pair of parallel crankshafts which are respectively linked to a pair of cylindrically curved blades for swinging the blades about an axis located equidistant from the crankshafts. Connected between the crankshafts for effecting rotation thereof is a hydraulic actuator having a cylinder in which a pair of pistons and rod units are mounted with the rods projecting oppositely from the cylinder and respectively connected to the crankshafts. Each of the piston and rod units is double acting and fluid is routed to and from the cylinder by a plurality of lines that are connected to the cylinder.

This patented actuator arrangement is not entirely satisfactory since unbalanced forces acting inside the cylinder and line flexure, caused when the shear head is adjusted relative to the boom supporting the same, tend to cause the cylinder to shift lengthwise along and/or rotate about the piston and rod units resulting in damage to the lines connected to the cylinder.

SUMMARY OF THE INVENTION

According to the present invention there is provided a restraint system for the cylinder of an actuator similar in type and mounting to the shear blade actuator disclosed in the above-described U.S. Pat. No. 3,826,295.

An object of the invention is to provide a restraint system for preventing endwise and rotative movements of the cylinder of a hydraulic actuator of the above-described type, while permitting certain unitary movement of the actuator.

Another object of the invention is to provide a cylinder restraint system comprising a simple arrangement of flexible tether elements.

These and other objects will become apparent from a reading of the ensuing description together with the appended drawings.

DESCRIPTION OF THE PREFERRED EMBODIMENT

Figure 1:
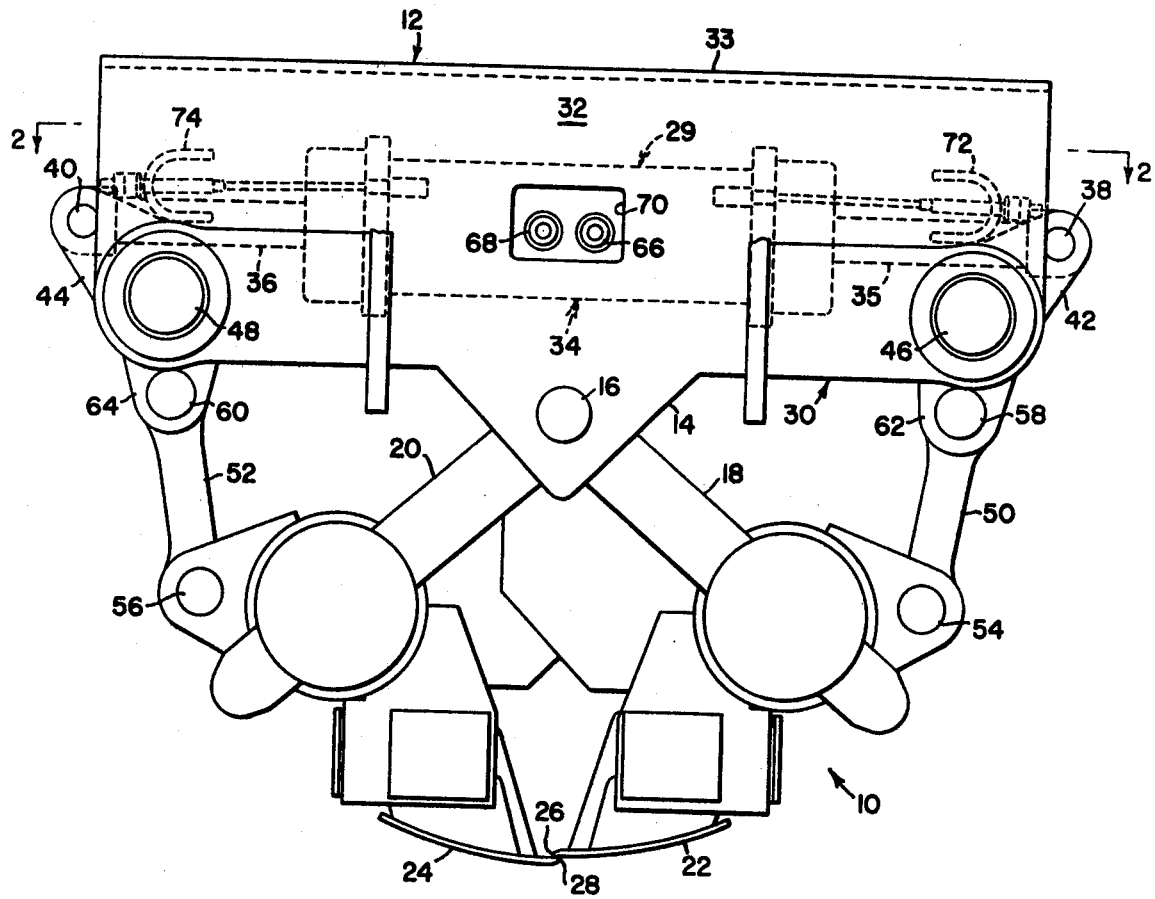
FIG. 1 is a somewhat schematic front elevational view of a shear head with some parts removed and others broken away for the sake of simplicity and clarity.
Figure 2:
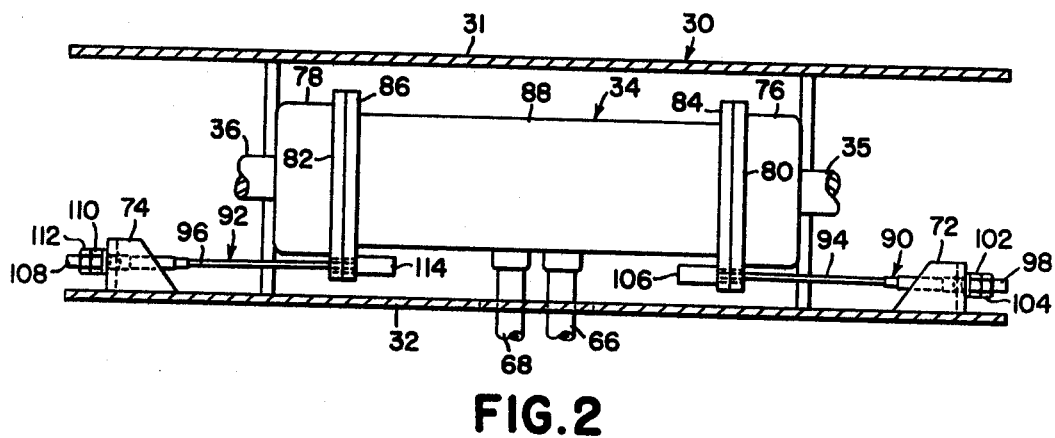
FIG. 2 is a sectional view taken along line 2—2 of FIG. 1, with parts being omitted so as to clearly show the actuator cylinder and the restraint system therefor.

Referring now to FIGS. 1 and 2 of the drawings, therein is shown a shear head 10 including a support frame 12 having a central lower portion 14 in which is mounted a horizontal, fore-and-aft extending pivot pin 16. Right and left blade support arms 18 and 20, respectively, are vertically swingably mounted on the pin 16 and right and left cylindrically curved blades 22 and 24, respectively, are fixed to the lower ends of the arms 18 and 20. The blades 22 and 24 respectively include fore-and-aft extending cutting edges 26 and 28 and are movable with the arms 18 and 20 between a closed position, as illustrated, wherein the edges 26 and 28 overlap each other, and an open position (not shown) wherein the edges 26 and 28 are separated from each other so as to permit the head 10 to be positioned adjacent a standing tree with the trunk of the tree positioned between the blades 22 and 24.

For the purpose of selectively driving the blades between the open and closed positions, there is provided a hydraulic actuator 29 disposed horizontally in a transverse housing 30 defined by front and rear upright walls 31 and 32, respectively, and a top wall 33 of the frame 12. The actuator 29 includes a cylinder 34 having right and left piston rods 35 and 36 respectively projecting from the right and left ends thereof. The inner ends of the rods 35 and 36 respectively carry right and left pistons (not shown) and the outer ends of the rods 35 and 36 are respectively pivotally connected, as at 38 and 40, to right and left drive input crank arms 42 and 44, which are respectively integrally fixed to right and left, fore-and-aft extending crank shafts 46 and 48, respectively, journaled in the frame 12 at respective locations adjacent the opposite ends of the housing 30 and equidistant from the pivot pin 16. Right and left motion transfer links 50 and 52 respectively have lower ends respectively pivotally connected to the arms 18 and 20, at 54 and 56, and have upper ends respectively pivotally connected, at 58 and 60, to right and left drive output crank arms 62 and 64 respectively integrally fixed to the crank shafts 46 and 48. It is here noted that the relationship between the actuator 29 and the input crank arms 42 and 44 is such that when the shear blades 22 and 24 are in the illustrated closed position the piston rods 35 and 36 are extended and the pivotal connections 38 and 40 between the piston rods 35 and 36 and the crank arms 42 and 44, respectively, are respectively outwardly of the axes of rotation of the crank shafts 46 and 48 and the cylinder occupies a relatively low position in the housing 12. Upon the actuator 29 being actuated to effect opening of the blades 22 and 24 by retraction of the rods 35 and 36, the pivotal connections 38 and 40 will first move arcuately upwardly until they are respectively disposed vertically above the axes of rotation of the crank shafts 46 and 48, the cylinder then occupying an upper position in the housing 12. As the rods 35 and 36 retract further, the pivotal connections move arcuately downwardly to respective positions located inwardly of the axes of rotation of the crank shafts 46 and 48, the cylinder then again occupying its low position. Thus it will be appreciated that during extension and retraction of the rods 35 and 36 respectively from inner-most and outer-most positions thereof, the cylinder 34 will rise and fall.

For the purpose of conveying working fluid to and exhaust fluid from the cylinder 34, right and left flexible hoses 66 and 68 are joined to a rear, central location of the cylinder. The hoses 66 and 68 project through a rectangular opening 70 provided in the rear wall 32 of the housing 30 and dimensioned to accommodate the vertical movement of the hoses 66 and 68 as the later follow the vertical movement of the cylinder 34 during actuation of the actuator 29.

During shearing of a tree, the force requirement for driving the blades 22 and 24 into a tree trunk may be different thus resulting in an unbalanced hydraulic force existing in the cylinder 34 which tends to shift the latter endwise along the piston rods 35 and 36.

During articulation of the shear head 10 about an axis of a connection (not shown) with a boom member carrying the shear head at one end thereof, the hoses 66 and 68 will flex and have a tendency to rotate the cylinder 34 about the piston rods 35 and 36.

The present invention deals with a restraint system for preventing the endwise and rotative movements of the cylinder 34 described in the two immediately preceding paragraphs. Specifically, the restraint system of the present invention includes right and left brackets 72 and 74 are respectively fixed at interior locations of the rear wall 32 of the housing 30 adjacent the right and left ends thereof and above the crank shafts 46 and 48. The cylinder 34 includes right and left end caps 76 and 78 respectively provided with flanges 80 and 82 which are in engagement with and fastened, as by bolts or the like, not shown, to corresponding flanges 84 and 86 provided at opposite ends of a central portion 88 of the cylinder 34. Right and left flexible tether elements 90 and 92 are respectively coupled between the bracket 72 and the cylinder flanges 80 and 84 and between the bracket 74 and the cylinder flanges 82 and 86. The elements 90 and 92 include respective central portions 94 and 96, preferably constructed of cable or wire rope or the like. A threaded member 98 is fixed to the right end of the central portion 94 of the tether element 90 and projects through a hole in the bracket 72 and is retained in place by a nut 102 and a jim nut 104 while the left end of the central portion 94 projects through a set of aligned bores in the flanges 80 and 84 and is retained therein by a stop member 106 fixed thereto. Similarly, a threaded member 108 is fixed to the left end of the central portion 96 of the tether element 92 and projects through a hole in the bracket 74 and is retained therein by a nut 110 and jim nut 112 while the right end of the central portion 96 projects through a set of aligned bores in the flanges 82 and 86 and is retained therein by a stop member 114 fixed thereto.

The operation of the present invention is briefly as follows. Initially the effective length of the tether elements 90 and 92 will be adjusted, by means of the nuts 102 and 110, so as to be taut when the cylinder 34 is in the position illustrated wherein it is in a centered, low position in the housing 30. Any tendency of the cylinder 34 to shift endwise to the right or left during shearing operation will be respectively restrained by the right and left tether elements 90 and 92 while the flexibility of the elements 90 and 92 will accommodate the rise and fall of the cylinder 34. Also, the tether elements 90 and 92 will act to restrain the cylinder 34 from rotating about its axis.

We claim:

1. In a tree shear head including a support frame, a pair of horizontal longitudinally extending crankshafts respectively rotatably mounted on the frame, a pair of shear blades mounted on the frame for vertical swinging movement toward and away from each other about a horizontal longitudinal axis located below and equidistant from the crankshafts, a pair of links respectively connecting the crankshafts to the pair of shear blades and a hydraulic actuator having a cylinder from the opposite ends of which respectively project a pair of piston rods having respective outer ends connected to the pair of crank shafts, the improvement comprising: a cylinder restraint means including first and second flexible members respectively connected between the frame and opposite end portions of the cylinder for restraining the cylinder from undergoing transverse and rotational movements relative to the piston rods.

2. The tree shear head defined in claim 1 wherein said first and second flexible members are cables.

3. The tree shear head defined in claim 2 wherein each of said cables includes connector means at one end for adjusting the effective length of the cable extending between the frame and the cylinder.

4. The tree shear head defined in claim 3 wherein the frame includes first and second brackets respectively located adjacent the opposite end of the cylinder and respectively provided with transverse holes; and said connector means at the one end of each cable including a threaded member projecting through a respective one of the transverse openings and having nut means received thereon.

5. The tree shear head defined in claim 4 wherein the cylinder is provided with first and second flanges adjacent opposite ends thereof; each of said flanges being provided with a transverse hole in which is located a respective one of said cables; and a second end of each cable including a stop member sized larger than a respective one of the transverse holes located in said first and second flanges.

* * * * *